(12) United States Patent
Yukawa et al.

(10) Patent No.: US 6,256,066 B1
(45) Date of Patent: Jul. 3, 2001

(54) HIGH-RESOLUTION IMAGE PICKUP METHOD AND APPARATUS THEREFOR

(75) Inventors: Noriaki Yukawa, Nara-ken; Hideshi Ueda, Yao; Tsuyoshi Nomura, Kyoto; Ken Shimono, Hirakata, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/881,334

(22) Filed: Jun. 24, 1997

(30) Foreign Application Priority Data

Jun. 28, 1996 (JP) .................................................... 8-169127

(51) Int. Cl.[7] .................................................... H04N 5/225
(52) U.S. Cl. ....................... 348/340; 348/218; 348/219; 348/222
(58) Field of Search ..................... 348/207, 218, 348/219, 239, 294, 311, 315, 335, 340, 360, 759, 761, 222; 250/208.1; H04N 5/238

(56) References Cited

U.S. PATENT DOCUMENTS 5,159,455 * 10/1992 Cox et al. ............................ 348/218
5,757,423 * 5/1998 Tanaka et al. ........................ 348/218

FOREIGN PATENT DOCUMENTS 60-136480 * 7/1985 (JP) .............................. H04N/5/238
3-70274 * 3/1991 (JP) .............................. H04N/5/238

OTHER PUBLICATIONS

"Automatic Inspection Technique for LCD Display Image Quality", Monthly LCD Intelligence, issued Mar. 1996, pp. 66–75.

* cited by examiner

Primary Examiner—Tuan Ho
(74) Attorney, Agent, or Firm—Wenderoth, Lind & Ponack, L.L.P.

(57) ABSTRACT

A high-resolution image pickup method includes dividing each of a plurality of light-receiving pixels of an image pickup sensor for capturing image information on an inspection subject into a plurality of regions, and capturing the image information from the inspection subject for each of the divided regions, thereby finally capturing image information on the inspection subject with all the regions of the light-receiving pixels.

26 Claims, 6 Drawing Sheets

HIGH-RESOLUTION IMAGE PICKUP METHOD AND APPARATUS THEREFOR

BACKGROUND OF THE INVENTION

The present invention relates to a method for picking up an image with high-resolution, and apparatus therefor. More specifically, the invention relates to a high-resolution image pickup method and apparatus therefor for enhancing the resolution of image pickup systems which are used for automatically deciding the conformity of inspection results in the production line with respect to inspections for point defects and the like on display devices used in electronic equipment and other fields, such as liquid crystal panels, shadow masks, CRT panels and plasma displays.

As a method for reading the screen displayed on a display device, there has been provided, as a primary method, one using a CCW area sensor, which is a two-dimensional sensor.

In this method, pixels arrayed in columns and rows of two-dimensional sensors and pixels arrayed in columns and rows of a display device are associated with each other (hereinafter, unless otherwise specified, pixels of the display device will be referred to as "display pixels", and pixels of the sensors will be referred to as "sensor pixels"), where the pixel arrangement is generally such that a plurality of sensor pixels are associated with one display pixel.

This is explained by taking a case of a display device of 3000×1000 pixels of a liquid crystal panel as an example. A liquid crystal panel includes display portions and non-display portions of the pixels. Point defects in the lighting inspection for these display portions can be classified into dark dots, which are a group of display pixels that will not make display in the displaying state of the liquid crystal panel, and bright dots, which are a group of display pixels that will make display in the non-display state. For an automatic inspection apparatus for inspecting these point defects, it is required to determine the correct positions of these point defects in the display device. In this case, when two sensor pixels are assigned to one display pixel, approximately 6000 pixels are required in the row direction.

However, it is not easy to increase the sensor pixels to meet the increasingly growing requirement of high-density pixels of liquid crystal panels. This is due to increases in the probability of defects of the sensor pixels themselves in the semiconductor manufacturing process, which is caused by the increase in the number of sensor pixels. For this reason, it would be the case to use a CCW area sensor with a low number of sensor pixels, where even such a method could not allow the required automatic inspection apparatus to be implemented. As the method of using a CCW area sensor with a low number of sensor pixels, there have conventionally been available a method of using a plurality of CCD area sensors in the first place, and a method of moving the relative positions of the CCD area sensor and the inspection subject in very small steps (for example, see a paper "Automatic Inspection Technique for LCD Display Image Quality" in the journal, "Monthly LCD Intelligence", issued March 1996, pp. 66–75).

However, the aforementioned two conventional methods have had the following issues.

First, in the first method of using a plurality of CCD area sensors, it would be difficult to align the image pickup optical systems of the inspection apparatus, and besides it would become complicated to treat the overlapped portions of image pickup portions of display pixels, which are the inspection subject, of each other image pickup sensors. Thus, this is not a method that will not desirably be employed. Also, when the CCD area sensor is very expensive, using a plurality of CCD area sensors would result in a very high-price image pickup system on the whole.

Figure 7:
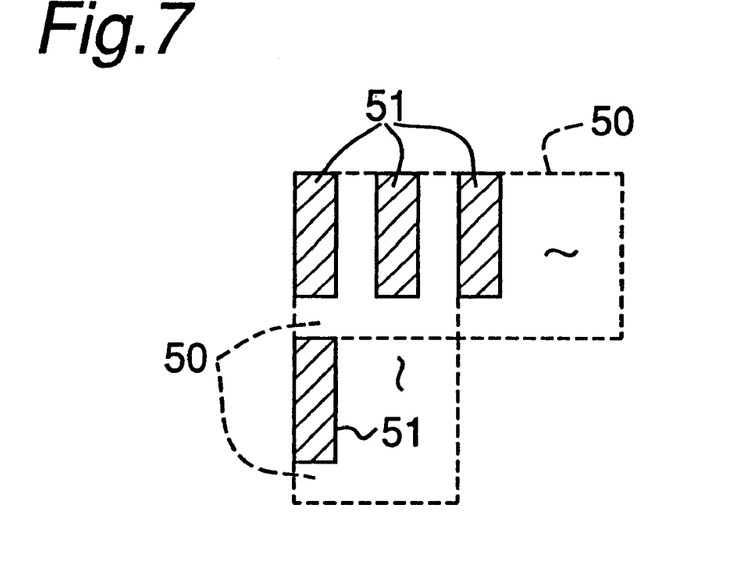
FIG. 7 is a view showing an assignment relation between display pixels and sensor pixels used in the explanation of the prior art.

In the second method of moving the relative positions of the CCD area sensor and the inspection subject in very small steps, since the number of pixels of the CCD area sensor is not increased, it could not be expected to greatly improve the resolution. For example, there may be a case where the number of display pixels would be increased, resulting in such a setting of magnification that display pixels 51 are small relative to sensor pixels 50 as shown in FIG. 7, where the display pixels are assigned to the sensor pixels. This is a case where the image pickup sensors count 1000 pixels in the row direction, while the display pixels count 2000 pixels in the row direction. In this case, even if the relative positions of the CCD area sensor and the inspection subject are moved in very small steps, it would be impossible to obtain information unique to the display pixels because only one image pickup sensor is assigned to two display pixels.

SUMMARY OF THE INVENTION

The object of the present invention is to provide a high-resolution image pickup method and apparatus therefor which can solve the foregoing issues and which can easily realize high resolution.

In accomplishing these and other aspects, according to a first aspect of the present invention, there is provided a high-resolution image pickup method comprising: dividing each of a plurality of light-receiving pixels of an image pickup sensor for capturing image information on an inspection subject into a plurality of regions; and capturing the image information from the inspection subject for each of the divided regions, thereby finally capturing image information on the inspection subject with all the regions of the light-receiving pixels.

According to a second aspect of the present invention, there is provided a high-resolution image pickup method according to the first aspect, wherein in capturing the image information, by providing light-receiving pixel region dividing parts between the inspection subject and the image pickup sensor, each of the light-receiving pixel region dividing parts being placed in correspondence to each light-receiving pixel of the image pickup sensor and being smaller in area than one of the light-receiving pixels, only light that has passed the light-receiving pixel region dividing part out of light derived from the inspection subject is captured by the light-receiving pixel of the image pickup sensor as image information.

According to a third aspect of the present invention, there is provided a high-resolution image pickup apparatus comprising: an image pickup sensor having a plurality of light-receiving pixels for capturing image information on an inspection subject; a light-receiving pixel region dividing member having light-receiving pixel region dividing parts, the member-being placed between the image pickup sensor and the inspection subject, moreover each of the light-receiving pixel region dividing parts being placed in correspondence to each light-receiving pixel of the image pickup sensor and being smaller in area than one of the light-receiving pixels, wherein only light that has passed the light-receiving pixel region dividing part out of light derived from the inspection subject is captured by the light-receiving pixel of the image pickup sensor as image information.

According to a fourth aspect of the present invention, there is provided a high-resolution image pickup apparatus according to the third aspect, wherein the light-receiving pixel region dividing member is a plate member having a light-shielding function, and each of the light-receiving pixel region dividing parts is an aperture of the plate member.

According to a fifth aspect of the present invention, there is provided a high-resolution image pickup apparatus according to the third or fourth aspect, wherein each of the light-receiving pixel region dividing parts is sized to be one half that of each light-receiving pixel of the image pickup sensor in horizontal and vertical directions each, and image information on the inspection subject is captured to the image pickup sensor in units of a quarter of each light-receiving pixel of the image pickup sensor.

According to a sixth aspect of the present invention, there is provided a high-resolution image pickup apparatus according to any of the third to fifth aspects, wherein the light-receiving pixel region dividing member is an exposure control plate made of light-shielding material and having a pinhole provided in one-to-one correspondence to each light-receiving pixel of the image pickup sensor, and wherein the high-resolution image pickup apparatus further comprises a lens installed so that light having passed the pinhole forms an image on the light-receiving pixel of the image pickup sensor.

According to a seventh aspect of the present invention, there is provided a high-resolution image pickup apparatus according to any of the third to sixth aspects, wherein the light-receiving pixel region dividing member is moved upon each completion of exposure of the image pickup sensor, where the exposure for the area of each light-receiving pixel of the image pickup sensor is completed plural times, whereby its resolution is enhanced.

According to an eighth aspect of the present invention, there is provided a high-resolution image pickup apparatus according to any of the third to seventh aspects, wherein the image pickup sensor is an image pickup sensor having an numerical aperture of 100%.

According to a ninth aspect of the present invention, there is provided a high-resolution image pickup apparatus according to any of the third to eighth aspects, wherein the light-receiving pixel region dividing member is given by a plate member having devices which can be controlled for a position and a size of transmission of light from the inspection subject, a quantity of the devices corresponding to a number of the light-receiving pixels of the image pickup sensor.

According to a tenth aspect of the present invention, there is provided a high-resolution image pickup apparatus comprising:
an image pickup sensor having a plurality of light-receiving pixels for capturing image information on an inspection subject;
a light-receiving pixel region dividing member having light-receiving. pixel region dividing parts, the member being placed between the image pickup sensor and the inspection subject, moreover each of the light-receiving pixel region dividing parts being placed in correspondence to each light-receiving pixel of the image pickup sensor and being smaller in area than one of the light-receiving pixels,
wherein a light-transmitting part of the light-receiving pixel region dividing parts of the light-receiving pixel region dividing member is moved so that only light that has passed the light-transmitting part of the light-receiving pixel region dividing parts out of light derived from the inspection subject is captured by the light-receiving pixel of the image pickup sensor as image information.

According to a tenth aspect of the present invention, there is provided a high-resolution image pickup apparatus according to the tenth aspect, wherein the light-receiving pixel region dividing member is a liquid crystal shutter having a light-shielding function, each of the light-receiving pixel region dividing parts is a liquid crystal pixel, and the light-transmitting part is a light-transmitting pixel.

The high-resolution image pickup apparatus of the aspect of the present invention, in which the number of pixels for image pickup is increased, is enabled to implement an assigned number of sensor pixels that is demanded for display pixels which is the inspection subject. In this case, a high resolution can be implemented by making up the optical system of the aspect of the present invention by selecting a CCD area sensor having no defects and less image pickup sensors.

Effects of obtaining a high resolution in the aspect of the present invention are explained below.

Figure 8:
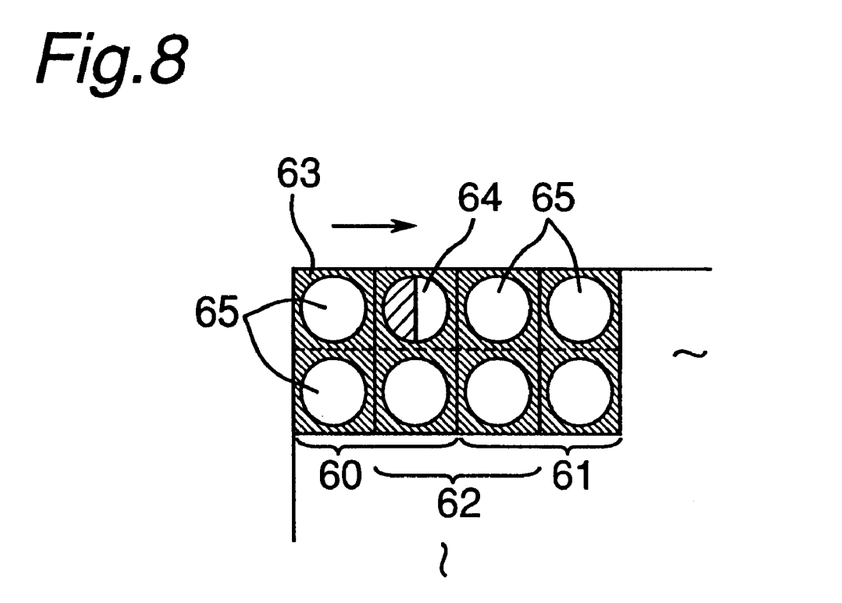
FIG. 8 is a view showing an assignment relation between display pixels and sensor pixels for explaining the operations and effects of the present invention from a comparison with the prior art.
Figure 9A:
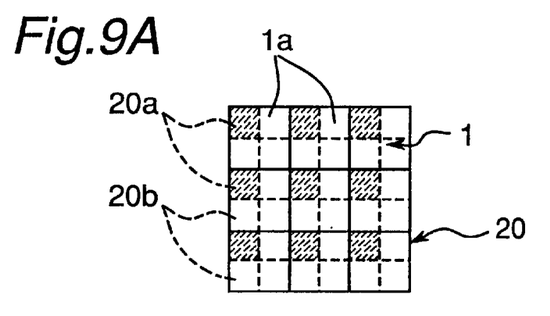
Figure 9B:
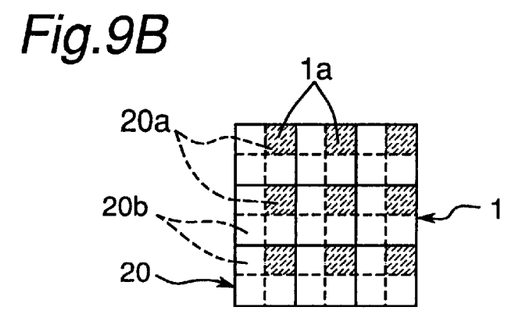
FIG. 9B shows a case where light is transmitted through upper right light-transmitting pixels 20a of liquid crystal pixels of the shutter so that an upper right portion of each light-receiving pixel of the image pickup sensor is exposed which corresponds to FIG. 5B.
Figure 9C:
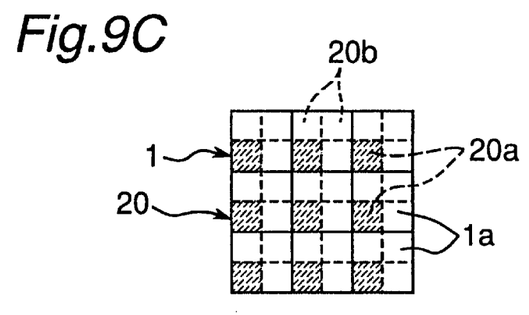
FIG. 9C shows a case where light is transmitted through lower left light-transmitting pixels 20a of liquid crystal pixels of the shutter so that a lower left portion of each light-receiving pixel of the image pickup sensor is exposed which corresponds to FIG. 5C.
Figure 9D:
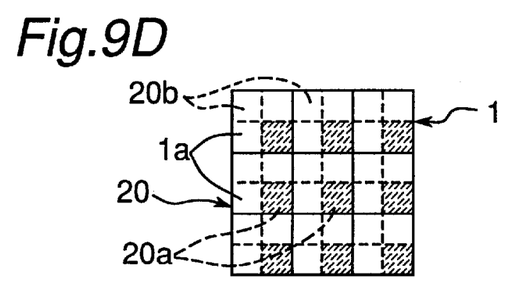
FIG. 9D shows a case where light is transmitted through lower right light-transmitting pixels 20a of liquid crystal pixels of the shutter so that a lower right portion of each light-receiving pixel of the image pickup sensor is exposed which corresponds to FIG. 5D.
Figure 9E:
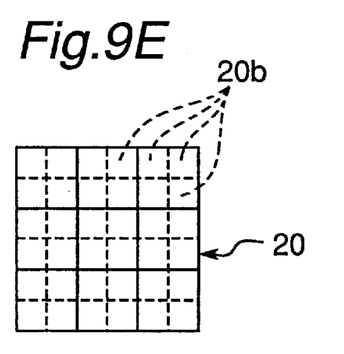
FIG. 9E shows a case where all portions of each light-receiving pixel of the image pickup sensor are not exposed and thus the light-shielding pixels 20b are shown.

FIG. 8 shows an image in shooting a component in which holes are formed regularly at shadowed portions where light is not transmitted. It is assumed that the holed portions are picked up so as to be bright in the image. In this example, when one sensor pixel is assigned to four holes, the size of sensor pixels is indicated by 60, 61. Shifting the sensor pixels 60 by one pitch results in the sensor pixels 61. Meanwhile, when one sensor pixel is assigned to one hole, the size of sensor pixels is indicated by 63.

Now assume that it is necessary to detect an abnormal hole 64 having a portion that will not transmit light only to, for example, 50% relative to a normal hole 65. In this case, the amount of received light in picking up the image of the normal hole 65 is taken as 100, while the amount of received light in picking up the image of the abnormal hole 64 including a 50% transmitting portion is taken as 50. Then, the following two cases, (a) and (b), are considered. It is noted that the case (a) corresponds to the prior-art method, and the case (b) corresponds to one embodiment of the present invention.

(a) For the sensor pixels 61, the total amount of light received from four normal holes 65 is 400m, while for the sensor pixels 60, the total amount of light received from three normal holes 65 and one abnormal hole 64 is 350. As a result, the sensor pixels 61, 60 differ in amount of received light from each other, as [400:350]=[1.0:0.875], so that the amount of received light of the sensor pixels 61 is 1.14 times larger than that of the sensor pixels 60.

(b) With a resolution set to the sensor pixel 63, the amount of received light of the sensor pixel 63 that impinges on the normal hole 65 is 100, while the amount of received light of the sensor pixel 63 that impinges on the abnormal hole 64 is 50. As a result, the sensor pixels 63 differ in amount of received light between an impingement on the normal hole 65 and an impingement on the abnormal hole 64 as [100:50]=[1.0:0.5], so that the amount of received light of the sensor pixel 63 that impinges on the normal hole. 65 is 2 times larger than that of the sensor pixel 63 that impinges on the abnormal hole 64.

In comparison between the two cases (a), (b), the sensitivity for detection of the abnormal hole 64 differs therebetween as [sensitivity of (b):sensitivity of (a)]=[2:1.14], hence a 1.75 times difference. As a consequence of this, it is found that the case (b), which is the smaller in size of the sensor pixels, i.e., higher in resolution, becomes higher in detection sensitivity than the case (a).

Even if the method shown in the prior art example in which the relative position of pixels is moved in very small steps is applied as an attempt of enhancing the detection sensitivity to that of the case (b), it could not be a solution. Referring to FIG. 8, the sensor pixels 62 show a case in which the sensor pixels 60 are shifted by half the pitch of the sensor pixels 60. In the case of a half-pitch shift also, the amount of received light of the sensor pixels 62 is 350, equal to that of the sensor pixels 60, the case being similar to the case (a). In comparison with the case (b), apparently, a sensitivity difference corresponding to a factor of 1.75 results.

By contrast, the aspect of the present invention is capable of attaining a detection sensitivity comparable to the case (b). That is, each light-receiving pixel of image pickup sensors is divided into small regions, and the plurally divided-small regions are assigned to display pixels, which are the inspection subject. By doing so, the number of pixels for image pickup is increased relatively, by which the assigned number of sensor pixels demanded for the display pixels, which are the inspection subject, can be implemented. Explaining with the example of FIG. 8, whereas the conventional method has been such that image information on one pixel is captured out of the entire sensor pixels 60, the aspect of the present invention is so devised that one light-receiving pixel is divided into, for example, four, i.e., the entire region of the sensor pixels 60 is divided into, for example, four sensor pixels 63, making it possible to capture four pieces of image information with respect to one display pixel, so that the resolution can be enhanced.

The aspect of the present invention is capable of enhancing the resolution by making up the optical system of the aspect of the present invention through a selection of a CCD area sensor having no defects and less image pickup sensors.

With the high-resolution image pickup method and apparatus therefor of the aspect of the present invention, each light-receiving pixel of image pickup sensors is divided into small regions, and the plurally divided-small regions are assigned to one target portion of an inspection subject. By doing so, the number of pixels for image pickup is increased relatively, by which a high resolution can be implemented easily. Also, using a CCD area sensor which is relatively low in price, less likely to have pixel defects in terms of probability, and low in number of image pickup sensors makes it possible to greatly enhance the resolution. Further, adjusting the size of the light-receiving pixel region dividing parts against the size of the image pickup sensors makes it possible to obtain a desired resolution easily.

BRIEF DESCRIPTION OF THE DRAWINGS

These and other aspects and features of the present invention will become clear from the following description taken in conjunction with the preferred embodiments thereof with reference to the accompanying drawings, in which:

FIGS. 5A to 5D are views in which the plate having the apertures is moved in front of image pickup sensors to allow transmission at a left portion, where FIG. 5A shows a case where an upper left portion of the pixel is exposed; FIG. 5B shows a case where an upper right portion of the pixel is exposed; FIG. 5C shows a case where a lower left portion of the pixel is exposed; and FIG. 5D shows a case where a lower right portion of the pixel is exposed;

FIGS. 9A to 9E are views showing a liquid crystal shutter having light-transmitting pixels and light-shielding pixels according to the other embodiment of the present invention, where FIG. 9A shows a case where light is transmitted through upper left light-transmitting pixels 20a of liquid crystal pixels of the shutter so that an upper left portion of each light-receiving pixel of the image pickup sensor is exposed which corresponds to FIG. 5A;

DETAILED DESCRIPTION OF THE PREFERRED EMBODIMENTS

Before the description of the present invention proceeds, it is to be noted that like parts are designated by like reference numerals throughout the accompanying drawings.

Hereinbelow, embodiments of the present invention are described with reference to the accompanying drawings.

Figure 1:
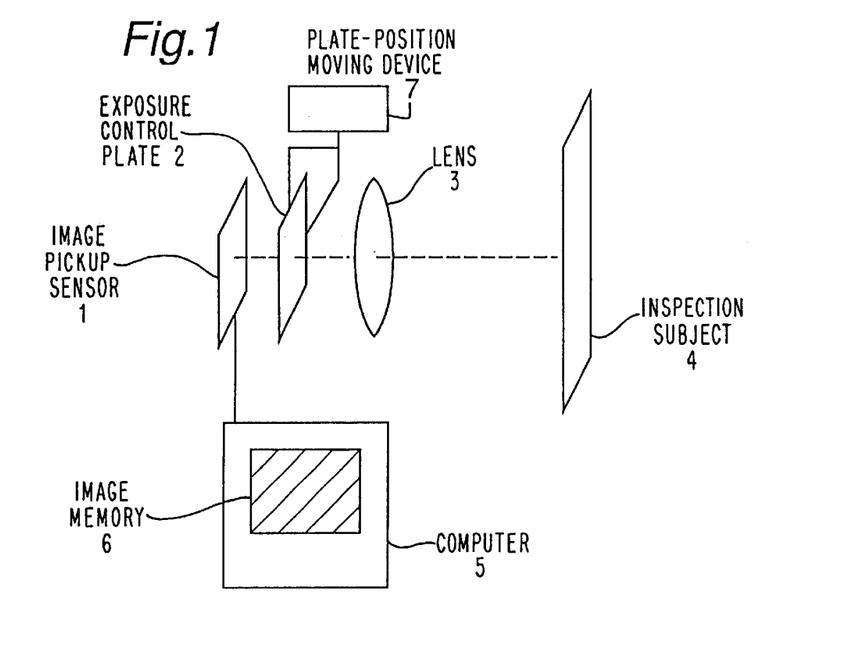
FIG. 1 is a schematic diagram of a high-resolution image pickup apparatus for embodying a high-resolution image pickup method according to one embodiment of the present invention.
Figure 2:
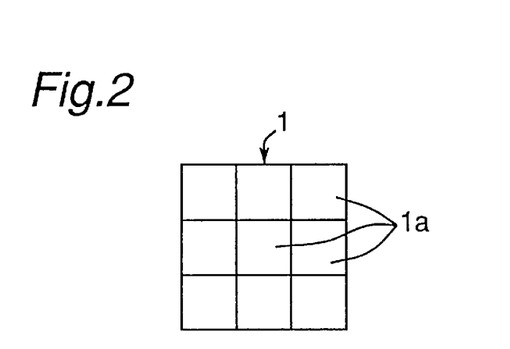
FIG. 2 is a view showing an image pickup sensor to be used in the apparatus of FIG. 1.

FIG. 1 is an arrangement diagram of a high-resolution image pickup apparatus for embodying a high-resolution image pickup method according to one embodiment of the present invention. In FIG. 1, there are shown an image pickup sensor 1 with a numerical aperture of nearly 100% disposed opposite to an inspection subject 4; an exposure control plate 2 which is placed in front of the image pickup sensor 1 and between the image pickup sensor 1 and the inspection subject 4, and which functions as a light-receiving pixel region dividing member having region apertures 2a each of which functions as light-receiving pixel region dividing part; and a lens 3 placed on the inspection subject side of the exposure control plate 2. For simplicity, the image pickup sensor 1 is assumed here to have a total of nine (3×3) light-receiving pixels 1a as shown in FIG. 2. That is, the apparatus comprises: the image pickup sensor 1 with a numerical aperture of nearly 100%; and the exposure control plate 2 having the apertures 2a formed at portions which transmit lights smaller than the image pickup sensor 1 corresponding to the number of image pickup sensor pixels that are located in front of the image pickup sensor 1 and that can be moved in very small steps, wherein the exposure control plate 2 having the apertures 2a moves in very small steps upon each completion of the image pickup sensor exposure, where the exposure is completed with respect to the area of each image pickup sensor pixel over plural times. Thus, the apparatus is enhanced in resolution.

Figure 3:
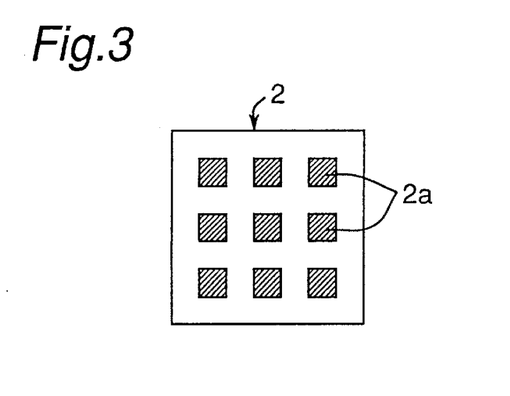
FIG. 3 is a view showing an exposure control plate with an aperture, which is used in the apparatus of FIG. 1.

The exposure control plate 2 has the apertures 2a as through holes that shadowed portions 2a of FIG. 3 transmit lights. In this embodiment, in order to double the resolution in horizontal and vertical directions, a hole having a ½ horizontal size and a ½ vertical size with respect to the size of each light-receiving pixel 1a of the image pickup sensor 1 is formed as a light transmitting portion to the image pickup sensor 1, where the hole is taken as the aperture 2a. Accordingly, in correspondence to nine light-receiving pixels 1a of the image pickup sensor 1 as shown in FIG. 2, nine apertures 2a are formed in the exposure control plate 2 as shown in FIG. 3.

It is also assumed that the exposure control plate 2 having the apertures 2a can be moved in very small steps by a plate-position moving device 7 whose drive source is a pulse motor or a linear motor, and that the exposure control plate 2 is moved four times in ½ pixel steps in horizontal and vertical directions.

The image pickup sensor 1 can acquire a gray signal for each pixel, which signal is fed to a computer 5 in digitized form. In the computer 5, the signal is stored in an image memory 6 as, for example, 8-bit density data, in a form compatible with row and columns of pixels. Further, programs in which an image processing algorithm for executing the defect detection is described are stored in the computer 5. A typical example of this image processing algorithm is to compare image data of a target pixel with image data of its surrounding pixels, and thereby detect portions that exceed an arbitrary threshold density.

Figure 4:
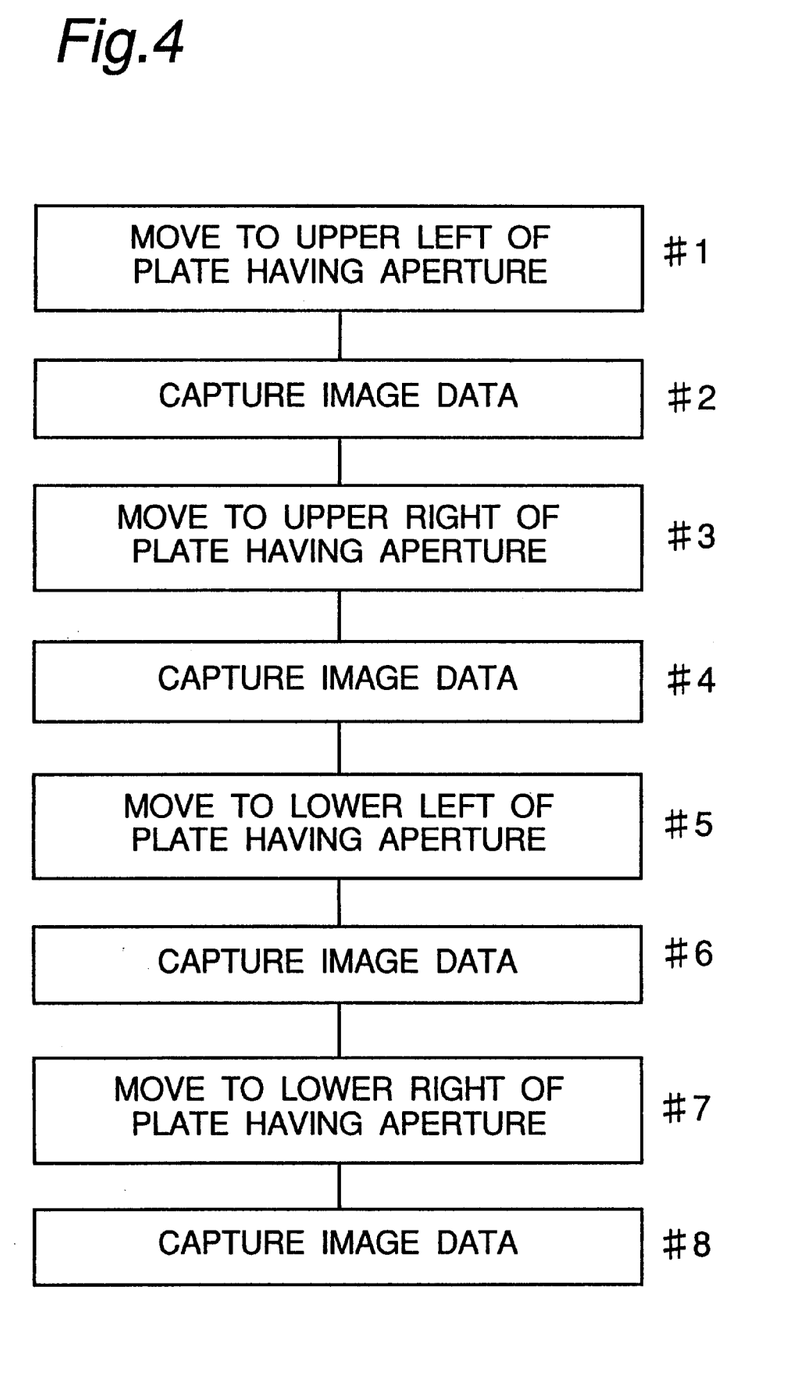
FIG. 4 is a chart showing the image capturing procedure in the embodiment.

FIG. 4 shows a processing flow in which image data are captured in the high-resolution image pickup apparatus of this embodiment. FIGS. 5A to 5D show positions where the exposure control plate 2 stops in front of the image pickup sensor 1 after a very small-step move, respectively. The processing flow is as follows.

Figure 5A:
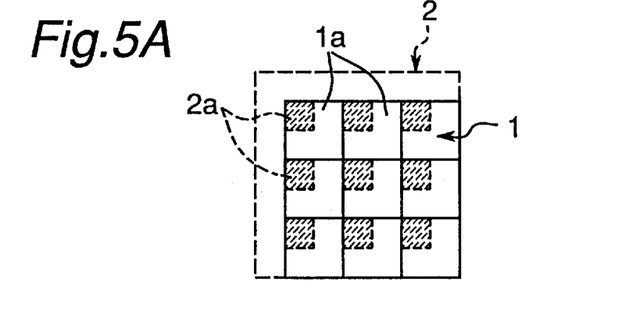

First, at step #1 in FIG. 4, the exposure control plate 2 is moved to an upper left position as shown in FIG. 5A with respect to the image pickup sensor 1. In this position of FIG. 5A, lower end edge and right end edge of the exposure control plate 2 as depicted by broken lines are coincident with lower end edge and right end edge of the image pickup sensor 1 as depicted by solid lines.

Figure 6:
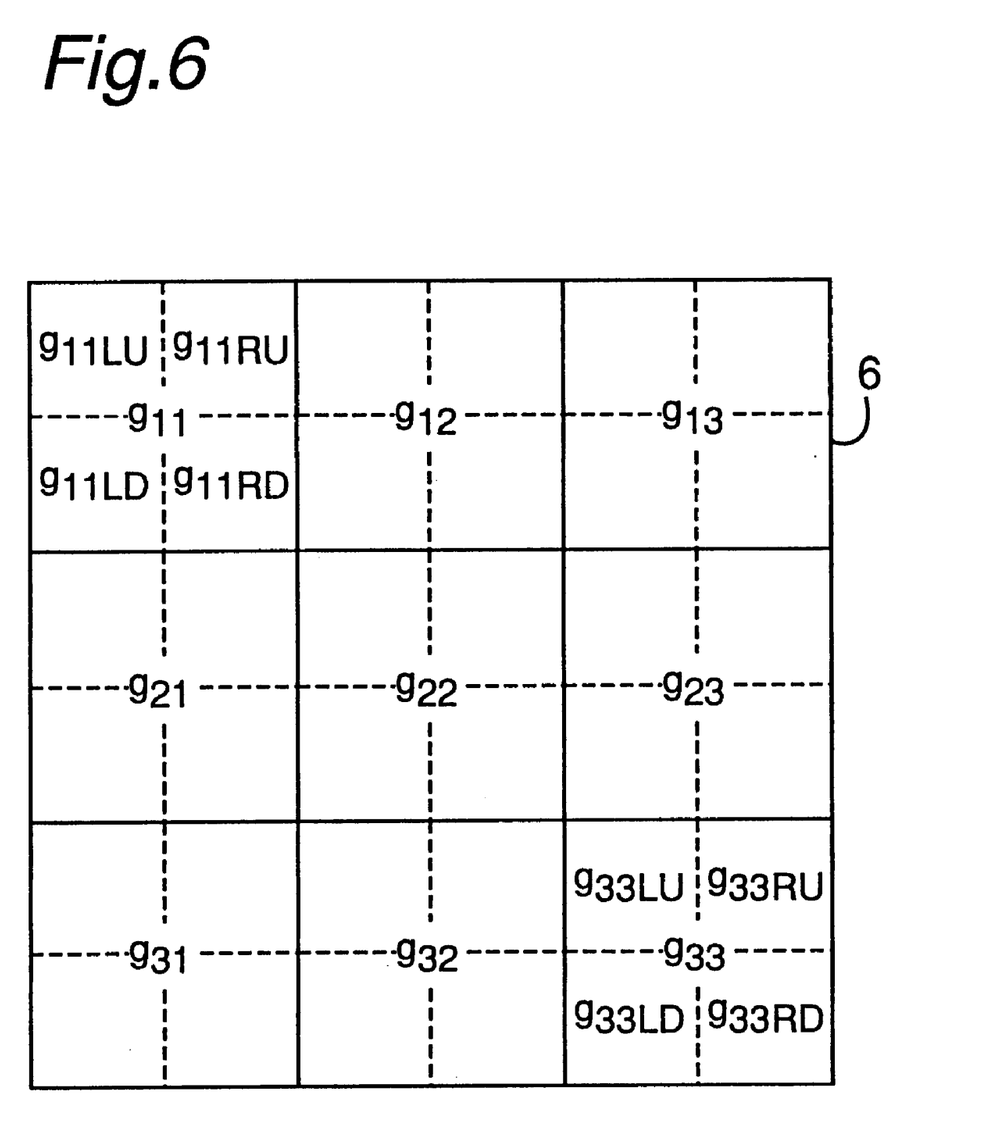
FIG. 6 is a view showing pixel data captured into an image memory in the embodiment.

Next, at step #2, the inspection subject 4 is exposed to light for the image pickup sensor 1 in the state of FIG. 5A, by which pixel data of the inspection subject 4 are captured into the computer S by the image pickup sensor 1, so that image data $g_{11LU}$, $g_{12LU}$, $g_{13LU}$, $g_{21LU}$, $g_{22LU}$, $g_{23LU}$, $g_{31LU}$, $g_{32LU}$, $g_{33LU}$ are stored on the image memory 6 as shown in FIG. 6, where the subscript characters "LU" mean that the pertinent image data are image data derived from the exposure control plate 2 located at the upper left position.

Figure 5B:
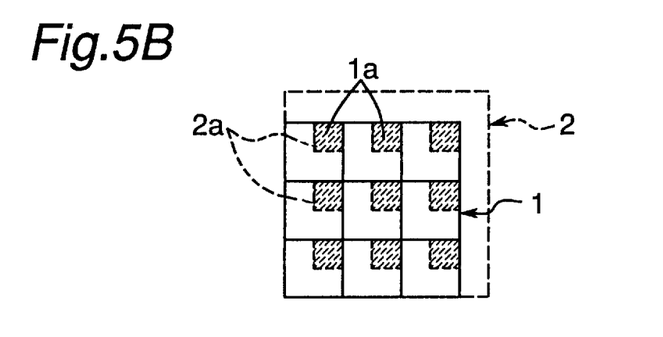

Next, at step #3, the exposure control plate 2 located in FIG. 5A over the exposure is moved up to an upper right position as shown in FIG. 5B with respect to the image pickup sensor 1. In this position of FIG. 5B, the lower end edge and left end edge of the exposure control plate 2 as depicted by broken lines are coincident with the lower end edge and left end edge of the image pickup sensor 1 as depicted by solid lines.

Next, at step #4, the inspection subject 4 is exposed to light for the image pickup sensor 1 in the state of FIG. 5B, by which pixel data of the inspection subject 4 are captured into the computer 5 by the image pickup sensor 1, so that image data $g_{22RU}$, $g_{12RU}$, $g_{13RU}$, $g_{21RU}$, $g_{22RU}$, $g_{23RU}$, $g_{31RU}$, $g_{32RU}$, $g_{33RU}$ are stored on the image memory 6 as shown in FIG. 6, where the subscript characters "RU" mean that the pertinent image data are image data derived from the exposure control plate 2 located at the upper right position.

Figure 5C:
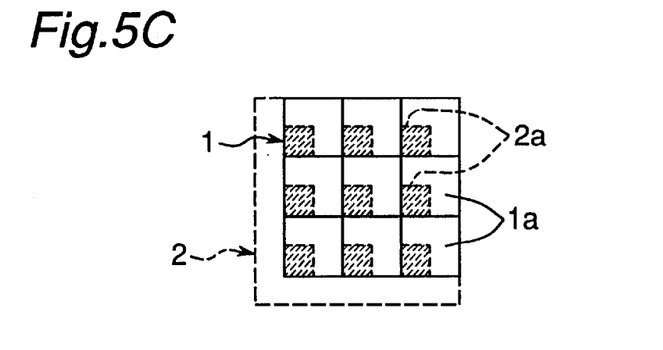

Next, at step #5, the exposure control plate 2 located in FIG. 5B over the exposure is moved up to a lower left position as shown in FIG. 5C with respect to the image pickup sensor 1. In this position of FIG. 5C, upper end edge and the right end edge of the exposure control plate 2 as depicted by broken lines are coincident with upper end edge and the right end edge of the image pickup sensor 1 as depicted by solid lines.

Next, at step #6, the inspection subject 4 is exposed to light for the image pickup sensor 1 in the state of FIG. 5C, by which pixel data of the inspection subject 4 are captured into the computer 5 by the image pickup sensor 1, so that image data $g_{11LD}$, $g_{12LD}$, $g_{13LD}$, $g_{21LD}$, $g_{22LD}$, $g_{23LD}$, $g_{31LD}$, $g_{32LD}$, $g_{33LD}$ are stored on the image memory 6 as shown in FIG. 6, where the subscript characters "LD" mean that the pertinent image data are image data derived from the exposure control plate 2 located at the lower left position.

Figure 5D:
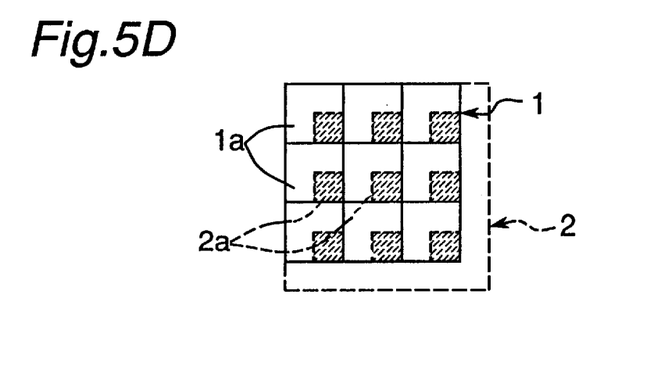

Next, at step #7, the exposure control plate 2 located in FIG. 5C over the exposure is moved up to a lower right position as shown in FIG. 5D with respect to the image pickup sensor 1. In this position of FIG. 5D, the upper end edge and the left end edge of the exposure control plate 2 as depicted by broken lines are coincident with the upper end edge and the left end edge of the image pickup sensor 1 as depicted by solid lines.

Next, at step #8, the inspection subject 4 is exposed to light for the image pickup sensor 1 in the state of FIG. 5D, by which pixel data of the inspection subject 4 are captured into the computer 5 by the image pickup sensor 1, so that image data $g_{11RD}$, $g_{12RD}$, $g_{13RD}$, $g_{21RD}$, $g_{22RD}$, $g_{23RD}$, $g_{31RD}$, $g_{32RD}$, $g_{33RD}$ are stored on the image memory 6 as shown in FIG. 6, where the subscript characters "RD" mean that the pertinent image data are image data derived from the exposure control plate 2 located at the lower right position.

It is noted that four pieces of image data of, for example, $g_{11LU}$, $g_{11RU}$, $g_{11LD}$ and $g_{11RD}$ are generically referred to as image data of $g_{11}$. Likewise, the image memory 6 has stored image data of $g_{12}$, ..., $g_{33}$.

As a result of the above processing, the image pickup sensor 1 is sequentially exposed to light of only portions of each light-receiving pixel 1a, i.e., upper left, upper right, lower left and lower right portions thereof, as shown in FIGS. 5A to 5D. That is, against a state in which the exposure control plate 2 having the apertures 2a is absent, each light-receiving pixel 1a of the image pickup sensor 1 makes image information on only the upper left portion, in FIG. 5A, image information on only the upper right portion, in FIG. 5B likewise, image information on only the lower left portion, in FIG. 5C likewise, and image information on only the lower right portion likewise, out of the portion assigned to each light-receiving pixel 1a exposed to light for the image pickup sensor 1. Thus, image information in each case is stored at its corresponding place of the image memory 6 as shown in FIG. 6. Resultantly, as shown in FIG. 6, image data divided into six equal divisions in horizontal and vertical directions in the inspection subject 4 are obtained as the whole image data. That is, the resolution has been enhanced to a double in horizontal and vertical directions each, by the above-described up-and-down, right-and-left very small-step moves of the exposure control plate 2 having the apertures 2a. Thereafter, a defect detecting process similar to the conventional one may be carried out on the image density data captured at high resolution.

Apparently, it can be understood that the resolution can be enhanced by changing the size of the exposure control plate 2 having the apertures 2a and by changing the amount of very small-step moves responsive to the size. For instance, consider a case in which a CCD area sensor having a pixel number of 2000×2000 is prepared as the image pickup sensor 1, and an exposure control plate 2 having the apertures 2a is prepared with the apertures 2a each having ⅓ horizontal and vertical size of the light-receiving pixel 1a in correspondence to the image pickup sensor 1, where the exposure control plate 2 having the apertures 2a is moved nine times in ⅓ pixel steps in horizontal and vertical directions each. In this case, the resolution is enhanced to a nine fold, equivalently, so that a resolution equivalent to the use of a CCD area sensor having 6000×6000 can be obtained.

For example, when the inspection subject is a 21 inch CRT display with a large number of 200 μm display pixels present, using a 2000×2000 pixel image pickup sensor would result in an assignment of only 200 μm sensor pixels, as converted in terms of the field of view. This means that only one sensor pixel can be assigned to the display pixel. As a result, an inspection, if executed with the resolution as it is, would cause the issues of the prior art as described before to take place. For this issue, in the above embodiment of the present invention, the following measures are taken. With a CCD area sensor having a pixel number of 2000× 2000 prepared as the image pickup sensor, a plate having apertures each of which is formed as a hole having a ½ horizontal size and a ½ vertical size with respect to the size of each pixel in correspondence to the image pickup sensor 1 is prepared, where the plate having the apertures is moved four times in ½ pixel steps in horizontal and vertical directions each. In this case, the resolution is enhanced to a four fold, equivalently, so that a resolution equivalent to the use of a CCD area sensor having 4000×4000 can be obtained. This example allows the effects as described in the operation of the present invention to be obtained. A resolution enhanced to a four fold allows the abnormal hole 64 to be detected at a sensitivity 1.75 times higher than the prior art.

With the high-resolution image pickup method and apparatus therefor according to the above embodiment of the present invention, each light-receiving pixel 1a of the image pickup sensor 1 is divided into small regions and the plurally divided-small regions are assigned to one inspection-target portion of the inspection subject, by which the number of pixels for image pickup can be increased relatively, so that high resolution can be easily implemented. Also, using a CCD area sensor which is relatively low in price, less likely to have pixel defects in terms of probability, and low in number of image pickup sensors makes it possible to greatly enhance the resolution. Further, adjusting the size of the light-receiving pixel region dividing parts against the size of the image pickup sensors makes it possible to obtain a desired resolution easily.

It is noted that the present invention is not limited to the above embodiment, and may be embodied in other various embodiments.

For example, the exposure control plate 2 having the apertures 2a as the light-receiving pixel region dividing member is not limited to one which is prepared with holes previously formed and will be moved. It is possible to adopt a method, for example, in which portions that transmit light and portions that do not transmit light are controlled automatically from external by using, for example, a liquid crystal shutter 20 or the like as shown in FIGS. 9A–9E. That is, the light-receiving pixel region dividing member may be given by a plate member, e.g. liquid crystal shutter 20 which has light-receiving pixel region dividing parts having liquid crystal pixels or like devices which transmits light from the inspection subject 4 and which can be controlled for the position and size of transmission of inspection subject's light from the external of the member, the quantity of the device corresponding to the number of light-receiving pixels of the image pickup sensor 1. More specifically, the shutter 20 in FIG. 9E has liquid crystal pixels, each of light-transmitting pixels 20a of which transmits light from the inspection subject 4 and each of light-shielding pixels 20b of which can not transmit light from the inspection subject 4. Thus, without any movement of the shutter 20 itself, the liquid crystal pixels can be controlled so that the light-transmitting pixels 20a are switched with the light-shielding pixels 20b as if the light-transmitting pixels are moved, as shown in FIGS. 9A–9D.

Also, in the above embodiment, the processing flow has been carried out in a sequence from upper left to upper right to lower left to lower right. However, the sequence is not limited this one only if it allows the entire pixel area to be exposed to light in the end.

Also, the arrangement of image data to be captured in the image memory 6 is not limitative.

Further, in the above embodiment, the exposure control plate 2 having the apertures has been placed in the rear of the lens 3. However, the position is not limited to this one, and may also be arbitrary one only if it is in front of the image pickup sensor 1.

The entire disclosure of Japanese Patent Application No. 8-169127 filed on Jun. 28, 1996, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A high-resolution image pickup method, for use with an image pickup sensor operable to capture image information of an inspection subject via a plurality of light-receiving pixels, said method comprising:

dividing each of the plurality of pixels of the image pickup sensor with a pixel dividing member into a plurality of regions each smaller than one of the pixels such that each pixel of the image pickup sensor corresponds to a plurality of regions; and capturing the image information of the inspection subject from each of the regions of each of the pixels so as to capture the entire image information of the inspection subject from all of the regions.

2. A high-resolution image pickup method according to claim 1, wherein said dividing comprises:

providing pixel dividing parts of the pixel dividing member between the inspection subject and the image pickup sensor, wherein each of the pixel dividing parts is smaller in area than one of the pixels;

placing the pixel dividing parts in correspondence with the pixels, respectively, such that only light passing through the pixel dividing parts is incident on the pixels.

3. A high-resolution image pickup apparatus for use with an inspection subject, said apparatus comprising:

an image pickup sensor having a plurality of pixels operable to capture image information from the inspection subject;

pixel dividing member including a plurality of pixel dividing parts each being smaller than one of said pixels and capable of passing light, said pixel dividing member being located between said image pickup sensor and the inspection subject, wherein the pixel dividing parts are located to correspond to the pixels, respectively, and only light passing through the pixel dividing parts is incident on the pixels.

4. A high-resolution image pickup apparatus according to claim 3, wherein said pixel dividing member is a light-shielding plate, and each of the pixel dividing parts is an aperture in said plate.

5. A high-resolution image pickup apparatus according to claim 4, wherein each of said pixels has a length and a width, and each of said pixel dividing parts has a length that is one half of the length of said pixels and a width that is one half of the width of said pixels, and the image information is captured by said image pickup sensor in units of a quarter of each of the pixels.

6. A high-resolution image pickup apparatus according to claim 4, wherein said pixel dividing member is an exposure control plate made of light-shielding material and having a pinhole provided in one-to-one correspondence with said pixels, said apparatus further comprising a lens installed so that light passing through said pinholes forms an image on said pixels, respectively.

7. A high-resolution image pickup apparatus according to claim 4, wherein said pixel dividing member is operable to move upon each completion of exposure of said image pickup sensor so that exposure for the area of each pixel is completed over plural exposures so as to enhance resolution.

8. A high-resolution image pickup apparatus according to claim 4, wherein said image pickup sensor has a numerical aperture of 100%.

9. A high-resolution image pickup apparatus according to claim 4, wherein said pixel dividing member comprises a plate member having a quantity of devices which are operable to change a position and a size of transmission of light from the inspection subject, and said quantity corresponds to a number of said pixels of said image pickup sensor.

10. A high-resolution image pickup apparatus according to claim 3, wherein each of said pixels has a length and a width, and each of said pixel dividing parts has a length that is one half of the length of said pixels and a width that is one half of the width of said pixels, and the image information is captured by said image pickup sensor in units of a quarter of each of the pixels.

11. A high-resolution image pickup apparatus according to claim 10, wherein said pixel dividing member is an exposure control plate made of light-shielding material and having a pinhole provided in one-to-one correspondence with said pixels, said apparatus further comprising a lens installed so that light passing through said pinholes forms an image on said pixels, respectively.

12. A high-resolution image pickup apparatus according to claim 10, wherein said pixel dividing member is operable to move upon each completion of exposure of said image pickup sensor so that exposure for the area of each pixel is completed over plural exposures so as to enhance resolution.

13. A high-resolution image pickup apparatus according to claim 10, wherein said image pickup sensor has a numerical aperture of 100%.

14. A high-resolution image pickup apparatus according to claim 10, wherein said pixel dividing member comprises a plate member having a quantity of devices which are operable to change a position and a size of transmission of light from the inspection subject, and said quantity corresponds to a number of said pixels of said image pickup sensor.

15. A high-resolution image pickup apparatus according to claim 3, wherein said pixel dividing member is an exposure control plate made of light-shielding material and having a pinhole provided in one-to-one correspondence with said pixels, said apparatus further comprising a lens installed so that light passing through said pinholes forms an image on said pixels, respectively.

16. A high-resolution image pickup apparatus according to claim 15, wherein said pixel dividing member is operable to move upon each completion of exposure of said image pickup sensor so that exposure for the area of each pixel is completed over plural exposures so as to enhance resolution.

17. A high-resolution image pickup apparatus according to claim 15, wherein said image pickup sensor has a numerical aperture of 100%.

18. A high-resolution image pickup apparatus according to claim 15, wherein said pixel dividing member comprises a plate member having a quantity of devices which are operable to change a position and a size of transmission of light from the inspection subject, and said quantity corresponds to a number of said pixels of said image pickup sensor.

19. A high-resolution image pickup apparatus according to claim 3, wherein said pixel dividing member is operable to move upon each completion of exposure of said image pickup sensor so that exposure for the area of each pixel is completed over plural exposures so as to enhance resolution.

20. A high-resolution image pickup apparatus according to claim 19, wherein said image pickup sensor has a numerical aperture of 100%.

21. A high-resolution image pickup apparatus according to claim 19, wherein said pixel dividing member comprises a plate member having a quantity of devices which are operable to change a position and a size of transmission of light from the inspection subject, and said quantity corresponds to a number of said pixels of said image pickup sensor.

22. A high-resolution image pickup apparatus according to claim 3, wherein said image pickup sensor has a numerical aperture of 100%.

23. A high-resolution image pickup apparatus according to claim 22, wherein said pixel dividing member comprises a plate member having a quantity of devices which are operable to change a position and a size of transmission of light from the inspection subject, and said quantity corresponds to a number of said pixels of said image pickup sensor.

24. A high-resolution image pickup apparatus according to claim 3, wherein said pixel dividing member comprises a plate member having a quantity of devices which are operable to change a position and a size of transmission of light from the inspection subject, and said quantity corresponds to a number of said pixels of said image pickup sensor.

25. A high-resolution image pickup apparatus for use with an inspection subject, said apparatus comprising:
- an image pickup sensor having a plurality of pixels operable to capture image information from the inspection subject;
- a pixel dividing member including a plurality of pixel dividing parts each being smaller than one of said pixels and capable of passing light, said pixel dividing member being located between said image pickup sensor and the inspection subject, wherein the pixel dividing parts are located to correspond to the pixels, respectively, and are operable to be moved so that only light passing through the pixel dividing parts is incident on the pixels.

26. A high-resolution image pickup apparatus according to claim 25, wherein said pixel dividing member is a liquid crystal shutter having a light-shielding function, each of said pixel dividing parts is a liquid crystal pixel.

* * * * *